(12) United States Patent
Koh et al.

(10) Patent No.: US 10,704,270 B2
(45) Date of Patent: Jul. 7, 2020

(54) RIGID MULTILAYER TILE AND PRODUCTION METHOD THEREOF

(71) Applicant: NOX CORPORATION, Chungcheongnam-do (KR)

(72) Inventors: Dong Hwan Koh, Seoul (KR); Woon Kyu Jang, Chungcheongnam-do (KR); Young Dae Song, Chungcheongnam-do (KR); Ki Young Yang, Daejeon (KR); Woo Jin Kim, Daejeon (KR)

(73) Assignee: NOX CORPORATION, Chungcheongnam-do (KR)

( * ) Notice: Subject to any disclaimer, the term of this patent is extended or adjusted under 35 U.S.C. 154(b) by 0 days.

(21) Appl. No.: 15/672,718

(22) Filed: Aug. 9, 2017

(65) Prior Publication Data

US 2018/0044925 A1 Feb. 15, 2018

(30) Foreign Application Priority Data

Aug. 10, 2016 (KR) .......................... 10-2016-0101863
Aug. 2, 2017 (KR) .......................... 10-2017-0098217

(51) Int. Cl.
*E04F 15/10* (2006.01)
*B29C 48/00* (2019.01)
(Continued)

(52) U.S. Cl.
CPC ........ *E04F 15/107* (2013.01); *B29C 48/0012* (2019.02); *B32B 5/18* (2013.01); *B32B 5/20* (2013.01); *B32B 7/12* (2013.01); *B32B 9/002* (2013.01); *B32B 21/14* (2013.01); *B32B 27/065* (2013.01); *B32B 27/08* (2013.01); *B32B 27/18* (2013.01); *B32B 27/20* (2013.01); *B32B 27/22* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/36* (2013.01); *B32B 27/40* (2013.01); *B32B 29/00* (2013.01); *E04F 15/225* (2013.01); *B29C 48/0011* (2019.02); *B29K 2027/06* (2013.01); *B29K 2105/04* (2013.01); *B29K 2511/02* (2013.01);
(Continued)

(58) Field of Classification Search
None
See application file for complete search history.

(56) References Cited

U.S. PATENT DOCUMENTS

2002/0136914 A1 9/2002 Uchida et al.
2015/0225964 A1* 8/2015 Chen ................... B29C 65/564
52/177
2016/0177579 A1 6/2016 Fang

FOREIGN PATENT DOCUMENTS

DE 199 34 743 A1 2/2000
JP H08-048014 A 2/1996
(Continued)

OTHER PUBLICATIONS

T. Furuta, Floor Material for Exterior, Nov. 2, 2006, machine translastion of JP 2006-299734 (Year: 2006).*
(Continued)

*Primary Examiner* — Chinessa T. Golden
(74) *Attorney, Agent, or Firm* — Scully, Scott, Murphy & Presser, P.C.

(57) ABSTRACT

Disclosed herein are a rigid tile including a foam cushion layer and a reinforcing layer, and a production method thereof.

13 Claims, 5 Drawing Sheets

(51) Int. Cl.
  *B32B 27/32*  (2006.01)
  *B32B 9/00*   (2006.01)
  *B32B 21/14*  (2006.01)
  *B32B 27/30*  (2006.01)
  *B32B 29/00*  (2006.01)
  *B32B 27/36*  (2006.01)
  *B32B 5/18*   (2006.01)
  *B32B 27/40*  (2006.01)
  *B32B 5/20*   (2006.01)
  *B32B 27/20*  (2006.01)
  *B32B 27/18*  (2006.01)
  *B32B 7/12*   (2006.01)
  *B32B 27/06*  (2006.01)
  *B32B 27/08*  (2006.01)
  *B32B 27/22*  (2006.01)
  *E04F 15/22*  (2006.01)
  *B32B 37/20*  (2006.01)
  *B29K 27/06*  (2006.01)
  *B29K 105/04* (2006.01)
  *B29K 511/02* (2006.01)
  *B29K 511/14* (2006.01)
  *B29L 31/00*  (2006.01)

(52) U.S. Cl.
  CPC ..... *B29K 2511/14* (2013.01); *B29L 2031/732* (2013.01); *B32B 37/203* (2013.01); *B32B 2250/40* (2013.01); *B32B 2255/08* (2013.01); *B32B 2255/12* (2013.01); *B32B 2255/26* (2013.01); *B32B 2255/28* (2013.01); *B32B 2264/06* (2013.01); *B32B 2264/067* (2013.01); *B32B 2264/10* (2013.01); *B32B 2264/102* (2013.01); *B32B 2264/104* (2013.01); *B32B 2266/025* (2013.01); *B32B 2266/0228* (2013.01); *B32B 2266/0235* (2013.01); *B32B 2266/0242* (2013.01); *B32B 2266/0264* (2013.01); *B32B 2266/0278* (2013.01); *B32B 2266/0292* (2013.01); *B32B 2274/00* (2013.01); *B32B 2307/102* (2013.01); *B32B 2307/304* (2013.01); *B32B 2307/306* (2013.01); *B32B 2307/4026* (2013.01); *B32B 2307/412* (2013.01); *B32B 2307/54* (2013.01); *B32B 2307/554* (2013.01); *B32B 2307/558* (2013.01); *B32B 2307/7265* (2013.01); *B32B 2307/734* (2013.01); *B32B 2419/04* (2013.01); *B32B 2471/00* (2013.01); *B32B 2607/02* (2013.01)

(56) References Cited

FOREIGN PATENT DOCUMENTS

| | | | |
|---|---|---|---|
| JP | 2002120347 A | * | 4/2002 |
| JP | 2006-299734 A | | 11/2006 |
| JP | 2006299734 A | * | 11/2006 |
| KR | 2003-0018670 A | | 3/2003 |
| KR | 2008-0086618 A | | 9/2008 |
| KR | 2009-0005529 A | | 1/2009 |
| KR | 2010-0057957 A | | 6/2010 |
| KR | 2010-0104113 A | | 9/2010 |
| KR | 2013-0122405 A | | 11/2013 |
| KR | 2015-0007431 A | | 1/2015 |
| KR | 20150007431 A | * | 1/2015 ............ E04F 15/107 |
| KR | 2016-0027660 A | | 3/2016 |
| KR | 20160027660 A | | 3/2016 |
| KR | 20160100097 A | | 8/2016 |
| WO | 2016/093313 A1 | | 6/2016 |

OTHER PUBLICATIONS

Park et al., Eco-Friendly for Elastic Floor Sheet, Jan. 21, 2015, machine translation of KR 2015-0007431 (Year: 2015).*

Ikeda, T. et al., Decorative Material, Apr. 23, 2002, machine translation of JP 2002-120347 (Year: 2002).*

Extended European Search Report dated Nov. 24, 2017 from related European Application No. 17185007.6, 8 pages.

* cited by examiner

RIGID MULTILAYER TILE AND PRODUCTION METHOD THEREOF

BACKGROUND

1. Technical Field

The present invention relates generally to a rigid multilayer tile and a production method thereof, and more specifically to a rigid multilayer tile which is used as a building material, and a production method thereof.

2. Description of the Related Art

Generally, for building materials and in particular for flooring materials, various materials are used, including plastics, ceramics, wood, and the like. In recent years, there has been an increased demand for products which have an excellent design, which are environmentally friendly and light in weight, and which have excellent strength, durability and moisture resistance. In particular, various efforts have been made to develop products which function as simple finishing materials and which also have various additional functions, including antibacterial, soundproofing, sound insulation and impact resistance properties, as well as special surface properties such as abrasion resistance, scratch resistance, heat resistance, contamination resistance or chemical resistance, and improved durability.

Tiles which are generally used as building materials, for example, flooring materials, are produced by applying pressure or heat to a plurality of sheets or layers or by laminating layers together using an adhesive. To impart various functions to tiles, layers made of various materials may be added, or a coating layer may be formed on the tile surface, or new additives may be added.

Conventional building materials that are widely used include flooring materials made of natural wood, laminated flooring materials produced by impregnating melamine resin into a backing core made of MDF or HDF to obtain HPM sheets and laminating the HPM sheets together by use of an adhesive, PVC tiles, and the like.

Wood flooring materials made of natural wood are weak against moisture, and undergo splitting, breakage, deformation and the like, which occur due to the nature of wood as a result of seasonal temperature changes and with the passage of time, and thus costs for maintaining and repairing these wood flooring materials are significant. Additionally, wood flooring materials have disadvantages in that wood itself is costly and the characteristics of wood vary depending on the type and extent of processing thereof, making it difficult to correctly use the same.

To overcome such disadvantages, laminated flooring materials have been developed and used. Laminated flooring materials overcome the above-described disadvantages of wood, and are produced by printing paper on a backing core made of MDF or HDF, and then impregnating the backing core with melamine resin to obtain HPM sheets, and laminating the HPM sheets using an adhesive. The laminated flooring materials have excellent surface strength and durability, but have the disadvantage of being weak against moisture and of being severely distorted by an external load.

PVC tiles made of polyvinyl chloride (PVC) are less deformed by temperature changes and have excellent moisture resistance and anti-curling properties, compared to wood or WPC, but have disadvantages in that they are produced using plasticizers that may generate volatile organic compounds and in that they are less hard.

Recently, to overcome the above-described disadvantages of PVC tiles and laminated flooring materials, wood-plastic composite (so-called WPC) produced by bonding an upper layer made of a PVC tile to a hard PVC foam layer by use of an adhesive, has been used. The hard foam tiles are light in weight and have a good cushioning feeling and walking feeling, but have problems in that they undergo severe dimensional changes by heating, have weak surface strength (such as surface defect occurrence) and weak durability, and are not environmentally friendly because an adhesive is used in bonding between layers. In an attempt to overcome such problems, Korean Patent Application Publication No. 2016-0027660 discloses a polyvinyl chloride resin flooring material having improved dimensional stability. Furthermore, Korean Patent Application Publication No. 2016-0100097 discloses a polyolefin-based, environmentally friendly non-slip flooring material and a production method thereof. However, none of the patent documents disclose a flooring material that includes a foam cushion layer and a reinforcing layer, is environmentally friendly because it contains only a small amount of a plasticizer, and has excellent strength, an excellent cushioning feeling, and the like.

SUMMARY

The present invention has been conceived to overcome the above-described problems, and an object of the present invention is to provide a rigid tile which is less deformed by temperature changes, which is light in weight, and which has high strength, an excellent cushioning feeling, an excellent walking feeling, and excellent soundproofing properties, and a production method thereof.

Another object of the present invention is to provide a rigid tile that is environmentally friendly because an adhesive is not used in bonding between layers of the tile and the use of a plasticizer is minimized, and a production method thereof.

To accomplish the above objects, according to one aspect of the present invention, there is provided a rigid multilayer tile including a foam cushion layer and a reinforcing layer;

wherein the foam cushion layer includes one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU);

wherein the foam cushion layer contains 0 to 20 phr of a plasticizer, 0 to 300 phr of a filler, and 0 to 5 phr of a foaming agent;

wherein the foam cushion layer has an expansion ratio of 120 to 300%;

wherein the reinforcing layer includes a rigid core layer;

wherein the rigid core layer includes one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU); and the rigid core layer contains 0 to 20 phr of a plasticizer and 0 to 500 phr of a filler.

According to another aspect of the present invention, there is provided a method for producing a rigid multilayer tile, the method including:

(a) preparing raw materials for a foam cushion layer;
(b) preparing raw materials for a reinforcing layer; and (c) extruding the raw materials described in (a) and (b) at once to form one sheet wherein the foam cushion layer includes one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU);

wherein the foam cushion layer contains 0 to 20 phr of a plasticizer, 0 to 300 phr of a filler, and 0 to 5 phr of a foaming agent;

wherein the foam cushion layer has an expansion ratio of 120 to 300%;

wherein the reinforcing layer includes a rigid core layer;

wherein the rigid core layer includes one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU); and wherein the rigid core layer contains 0 to 20 phr of a plasticizer and 0 to 500 phr of a filler.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Rigid multilayer tiles according to embodiments of the present invention will be described in detail below with reference to the accompanying drawings.

Throughout the drawings, the thickness or size of each layer may be exaggerated, omitted, or schematically illustrated for ease of description and clarity, and like reference numerals refer to like elements. As used herein, the term "and/or" includes any one of corresponding listed items and all combinations of one or more thereof.

The terms used herein are used merely to describe specific embodiments, and are not intended to limit the invention. As used herein, a singular form is intended to include a plural form as well, unless the context clearly indicates otherwise. It will be further understood that the terms "comprises," "comprising," and their derivatives used herein specify the presence of stated features, integers, steps, operations, elements, and/or components, but do not preclude the presence or addition of one or more other features, integers, steps, operations, elements, components, and/or groups thereof.

The rigid tiles according to the present invention may be used as building materials, for example, wall coverings or flooring materials. These tiles may be used as wall coverings or flooring materials in offices or houses. In particular, the tiles may be used as flooring materials.

One Embodiment of the Present Invention

A rigid tile according to one embodiment of the present invention includes a foam cushion layer and a reinforcing layer. In this case, the reinforcing layer may be laminated on and beneath the foam cushion layer to form a three-layer structure consisting of a reinforcing layer, a foam cushion layer and a reinforcing layer, which are formed in that order (see FIG. 1). Furthermore, the reinforcing layer may be laminated on the foam cushion layer to form a two-layer structure consisting of a reinforcing layer and a foam cushion layer (see FIG. 2), or may be laminated beneath the foam cushion layer to form a two-layer structure consisting of foam cushion layer and a reinforcing layer (see FIG. 3).

Each layer of the tile will be described below.

Foam Cushion Layer

The foam cushion layer gives lightweight performance to the tile product and can absorb impact. When the tile is used as a flooring material, the foam cushion layer may give a comfortable walking feeling and exhibit a soundproofing effect.

The foam cushion layer includes one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU).

When building materials, for example, flooring materials, include the foam cushion layer, these products can easily absorb impact to thereby provide a comfortable walking feeling and a soundproofing effect.

The foam cushion layer preferably contains 0 to 20 phr of a plasticizer, 0 to 300 phr of a filler, and 0 to 5 phr of a foaming agent.

The foam cushion layer has a reduced content of a plasticizer, and thus has increased strength. Furthermore, the foam cushion layer contains a reduced amount of a volatile organic compound, and thus renders the tile product environmentally friendly. Therefore, the tile including the foam cushion layer according to the present invention has advantages over conventional building materials in that it environmentally friendly, is light in weight and has high strength.

As the foaming agent, one or more of azodicarbonamide (ADCA or AC) and P,P'-oxy bis(benzene sulfonyl hydrazide) (OBSH) may be used, and isocyanate, water, an azo-, hydrazine- or nitrogen-based compound, or an inorganic foaming agent such as sodium bicarbonate ($NaHCO_3$), may also be used, but the scope of the present invention is not limited thereto.

The expansion ratio of the foam cushion layer is preferably 120 to 300%. If the expansion ratio is lower than 120%, the content of the raw material increases, so the production cost goes up, and the weight-reducing effect may not be significant. If the expansion ratio is higher than 300%, the strength may decrease.

The foam cushion layer may include a composite of the polymer resin with a wood chip or a cork chip, in which the content of the chip is 1 to 40 phr.

Where the foam cushion layer includes the polymer resin without including the wood chip or the cork chip, it preferably contains 0.1 to 5 phr of the foaming agent. Where the foam cushion layer includes the composite, it preferably does not contain the foaming agent.

Figure 1:
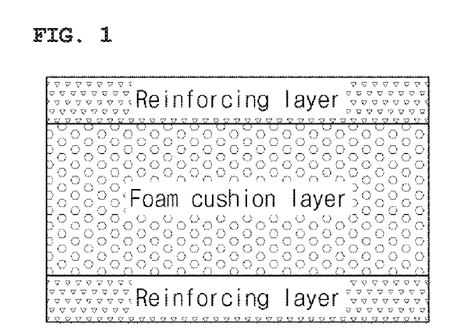
FIG. 1 illustrates a rigid tile having a three-layer structure according to an embodiment of the present invention.
Figure 2:
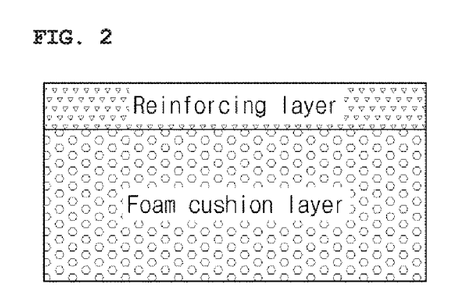
FIGS. 2 and 3 illustrate rigid tiles having a two-layer structure according to other embodiments of the present invention.
Figure 3:
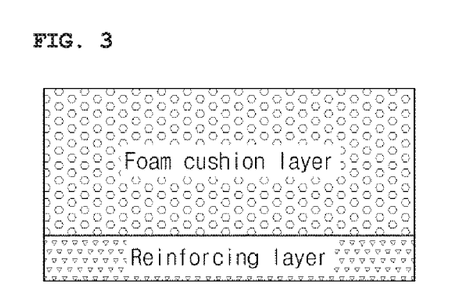

The foam cushion layer is disposed beneath or on the reinforcing layer, or between two reinforcing layers (see FIGS. 1 to 3).

The thickness of the foam cushion layer may be adjusted depending on the thicknesses of other layers, the intended use or properties of the tile, and the like.

Reinforcing Layer

The reinforcing layer may be disposed at the top and/or bottom of the tile to form a surface portion, and one or more additional layers may also be laminated on the reinforcing layer.

The reinforcing layer may include a rigid core layer.

The reinforcing layer serves to provide durability and dimensional stability and to reinforce the strength of the foam cushion layer. The foam cushion layer provides desirable effects, including weight reduction, impact absorption, an improved walking feeling, and soundproofing, but may cause problems such as breakage after click processing due to its low strength, distortion caused by temperature changes, a reduction in dimensional stability, or the like. The reinforcing layer is formed to overcome the disadvantages of the foam cushion layer, and may be disposed on or beneath, or on and beneath the foam cushion layer.

The rigid core layer includes one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU). The rigid core layer is preferably made of polyethylene terephthalate (PET), which is a type of polyester resin, or polyvinyl chloride (PVC) resin. More preferably, the core layer is made of polyvinyl chloride resin. If polyvinyl chloride resin is used, it may have a polymerization degree of 700 to 2000. If the polymerization degree is lower than the lower limit of the above-described range, a problem may arise in that the mechanical properties of the core layer reduced, and if the polymerization degree is higher than the upper limit of the above-described range, a problem may arise in that the processing temperature of the core layer is increased, that is, the processability of the core layer is reduced. More preferably, the polymerization degree is 800 to 1300.

The rigid core layer preferably contains 0 to 20 phr of a plasticizer and 0 to 500 phr of a filler. The contents of the plasticizer and the filler may vary depending on the hardness of the foam cushion layer and the content of respective ingredients.

The rigid core layer is made of a hard material so that the tile product itself is hard and solid. The rigid core layer has high mechanical strength and exhibits excellent resistance to dimensional deformation, which may lead to excellent dimensional stability and minimize curling. Because the dimensional deformation of the rigid core layer is minimized, no gap occurs between tiles, for example, flooring materials, and thus contamination of the tile can be reduced and the ease of cleaning of the tile can be ensured. Building materials, for example, flooring materials, which include this rigid core layer, give a hard and solid feeling, like wood.

Because the rigid core layer contains no plasticizer or a very small amount (20 phr or less) of a plasticizer, the rigid tile including the rigid core layer has advantages in that it has excellent mechanical strength and excellent anti-curling properties, and the length thereof is less changed by heating. However, this rigid tile has disadvantages in that it has a poor walking feeling due to its hard surface and is difficult to handle, due to its relatively heavy weight. In the present invention, such disadvantages are overcome by use of the foam cushion layer together with the rigid core layer.

The rigid core layer may further include, in addition to the polymer resin, the plasticizer and the filler, one or more additives selected from the group consisting of a stabilizer, a processing aid, an impact modifier, an internal lubricant, an external lubricant, and a pigment.

In one embodiment of the present invention, the rigid core layer may include 1 to 10 phr of a stabilizer, 10 to 500 phr of a filler, 0.1 to 10 phr of a processing aid, 2 to 15 phr of an impact modifier, 0.1 to 5 phr of an internal lubricant, 0.01 to 5 phr of an external lubricant, and 0.05 to 15 phr of pigment. Preferably, the rigid core layer may include 2 to 7 phr of a stabilizer, 30 to 300 phr of a filler, 0.5 to 7 phr of a processing aid, 3 to 10 phr of an impact modifier, 0.3 to 2 phr of an internal lubricant, 0.01 to 1 phr of an external lubricant, and 2 to 7 phr of a pigment.

The content of the plasticizer that is contained in the rigid core layer of the present invention is 0 to 20 phr, preferably 0 to 7 phr. If the content of the plasticizer is less than 20 phr, the rigid core layer will have excellent mechanical strength and dimensional stability, but if the content of the plasticizer is more than 20 phr, there will be a problem in that the mechanical properties, dimensional stability and environmentally friendly properties of the rigid core layer are reduced.

The rigid core layer according to the present invention gives increased strength by reducing the content of the plasticizer and provides the tile product environmentally friendly by reducing the amount of a volatile organic material. Accordingly, the tile including the rigid core layer according to the present invention has advantages over conventional building materials in that it is environmentally friendly and has high strength.

The content of the stabilizer that is used in the rigid core layer according to the present invention is 1 to 10 phr, preferably 2 to 7 phr. If the content of the stabilizer is less than 1 phr, the thermal stability of the rigid core layer may be reduced so that discoloration of the tile product may occur, and if the content of the stabilizer is more than 10 phr, economic efficiency may be reduced.

Furthermore, the content of the filler that is used in the rigid core layer according to the present invention is 10 to 500 phr, preferably 30 to 300 phr. If the content of the filler is less than 10 phr, economic efficiency may be reduced, and if the content of the filler is more than 500 phr, there will be a disadvantage in that the mechanical properties of the core layer are reduced.

The content of the processing aid that is used in the rigid core layer according to the present invention is 0.1 to 10 phr, preferably 0.5 to 7 phr, based on 100 phr. If the content of the processing aid is less than 0.1 phr, processability will be reduced to cause surface defects, and if the content of the processing aid is more than 10 phr, economic efficiency will be reduced.

The content of the impact modifier that is used in the rigid core layer according to the present invention is 2 to 15 phr, preferably 3 to 10 phr. If the content of the impact modifier is less than 2 phr, the impact resistance of the core layer will be reduced, and if the content of the impact modifier is more than 15 phr, economic efficiency will be reduced.

Moreover, the content of the internal lubricant that is used in the rigid core layer according to the present invention is 0.1 to 5 phr, and the content of the external lubricant in the rigid core layer is 0.01 to 5 phr. Preferably, the content of the internal lubricant is 0.3 to 2 phr, and the external lubricant is 0.01 to 1 phr. If the content of the internal lubricant is less than 0.1 phr, extrusion load will be increased, and if the content of the internal lubricant is more than 5 phr, economic efficiency will be reduced. If the content of the external lubricant is less than 0.01 phr, the possibility of generating decomposition materials in an extruder will increase, and if the content of the external lubricant is more than 5 phr, the lubricant will move to the surface of the product to reduce the properties of the product.

The content of the pigment that is used in the rigid core layer according to the present invention is 0.05 to 15 phr, preferably 2 to 7 phr. If the content of the pigment is less than 0.05 phr, it will be difficult to obtain a desired opaque property or color, and if the content of the pigment is more than 15 phr, economic efficiency will be reduced.

In one embodiment of the present invention, the plasticizer includes one or more selected from the group consisting of dioctyl phthalate (DOP), diisononyl phthalate (DINP), diisodecyl phthalate (DIDP), diundecyl phthalate (DUP), trioctyl trimellitate (TOTM), dioctyl adipate (DOA), dioctyl terephthalate (DOTP), 1,2-cyclohexane dicarboxylic acid diisononyl ester (DINCH), dipropylheptylphthalate (DPHP), acetyltributylcitrate (ATBC), vegetable plasticizers, and benzoate. Preferably, the plasticizer is dioctyl terephthalate (DOTP) which is an environmentally friendly plasticizer, but the scope of the present invention is not limited thereto.

In one embodiment of the present invention, the stabilizer includes one or more selected from the group consisting of a metal soap stabilizer, an organotin-containing complex stabilizer, and an epoxy-based stabilizer, wherein the metal soap stabilizer includes, for example, one or more selected from the group consisting of Ba/Zn, Ca/Zn and Na/Zn, and is preferably based on environmentally friendly Ca/Zn, but the scope of the present invention is not limited thereto.

In one embodiment of the present invention, the filler includes one or more selected from the group consisting of calcium carbonate, silica, alumina, sepiolite, talc, antimony oxide, aluminum oxide, fly ash, and furnace slag. Preferably, the filler includes one or more selected from the group consisting of calcium carbonate, sepiolite, and a mixture thereof, but the scope of the present invention is not, limited thereto.

In one embodiment of the present invention, the processing aid serves to increase melting rate and viscosity and to make a molten state uniform and also to improve processability. The processing aid includes one or more selected from the group consisting of acrylic polymers, styrene copolymers, mineral oils, petrolatum, paraffin wax, petroleum resins, fatty acids, fatty acid esters, fatty alcohols, metal soap, fatty acid amides, phenolic resin, polyethylene, polybutene, and organic silicone. Preferably, the processing aid includes one or more selected from the group consisting of acrylic polymers, styrene copolymers, and mixtures thereof, but the scope of the present invention is not limited thereto.

In one embodiment of the present invention, the impact modifier serves to improve impact resistance, and includes one or more selected from the group consisting of acrylic polymers, methacrylate butadiene styrene (MBS), chlorinated polyethylene (CPE), and silicone-based acrylic rubber. Preferably, the impact modifier includes one or more selected from the group consisting of chlorinated polyethylene, acrylic polymers, and mixtures thereof, but the scope of the present invention is not limited thereto.

In one embodiment of the present invention, the lubricants are divided into an internal lubricant that reduces the viscosity of melted thermoplastic resin to enhance the processability of the resin during heat molding of the resin, and an external lubricant that reduces the frictional force between melted resin and a processing machine such as the barrel of extruder to thereby reduce the generation of decomposition materials in the processing machine and facilitate detachment of the resin from the processing machine.

Generally, the lubricant includes one or more selected from the group consisting of polar group-free, long-chain hydrocarbon-based lubricants, including paraffin oil, natural paraffin, and polyethylene wax; fatty acid-based lubricants, including stearic acid, and stearic acid hydroxide; fatty acid amide-based lubricants, including stearic acid amide, oleic acid amide, and erucic acid amide; fatty acid ester-based lubricants including butyl stearate, and glycerol monostearate; and fatty acid alcohol-based lubricants, including cetyl alcohol, stearic alcohol, and palmityl alcohol. Preferably, the internal lubricant includes one or more from the group consisting of fatty acid ester-based lubricants and fatty acid alcohol-based lubricants, and the external lubricant includes one or more selected from the group consisting of fatty acid amide-based lubricants, fatty acid-based lubricants, and mixtures thereof, but the scope of the present invention is not limited thereto.

In one embodiment of the present invention, the pigment serves to improve masking ability, and includes one or more selected from the group consisting of organic pigments, inorganic pigments, and mixtures thereof, which have various colors. The inorganic pigment is preferably anatase titanium dioxide ($TiO_2$) or rutile titanium dioxide ($TiO_2$), more preferably rutile titanium dioxide ($TiO_2$), but the scope of the present invention is not limited thereto.

In one embodiment of the present invention, the thickness of the rigid core layer may vary depending on the thicknesses of other layers and the properties and intended use of the tile, etc., but is 0.2 to 7 mm, preferably 0.2 to 5.0 mm. If the thickness of the rigid core layer is smaller than 0.2 mm, a problem may arise in that the dimensional stability of the core layer is reduced, and if the thickness of the rigid core layer is greater than 7 mm, a problem may arise in that the tile product becomes heavier in weight and economic efficiency is reduced.

The polymer resin that is contained in the foam cushion layer is preferably the same as the polymer resin that is contained in the reinforcing layer. This is because, when the resins in the two layers are the same, the bonding strength between the two layers is good. For example, if the foam cushion layer includes polyvinyl chloride resin and the reinforcing layer also includes polyvinyl chloride resin, the two layers can be easily bonded to each other.

Furthermore, the foam cushion layer and the reinforcing layer may be bonded to each other without using an adhesive. In other words, the foam cushion layer and the reinforcing layer can be formed into a sheet at once by extrusion or double belt press. It is more preferable to form the sheet by extrusion.

The reinforcing layer may be laminated on or beneath the foam cushion layer to form a two-layer structure consisting of a reinforcing layer and a foam cushion layer. Furthermore, the reinforcing layer may be laminated on and beneath the foam cushion layer to form a three-layer structure consisting of an upper reinforcing layer, a foam cushion layer and a lower reinforcing layer. This three-layer structure is characterized in that the outer reinforcing layers are strong and the inner foam cushion layer is light and soft.

In addition, the lower surface of the foam cushion layer or the reinforcing layer may include a plurality of embossing layers. In comparison to when the lower surface of the foam cushion layer or the reinforcing layer is smooth, when the lower surface includes a plurality of embossing layer's moisture or gas can be easily discharged from the layer, and thus deformation of the tile can be efficiently reduced, thereby reducing limitations on a place to which the tile is applied.

Other Embodiments of the Present Invention

Figure 4:
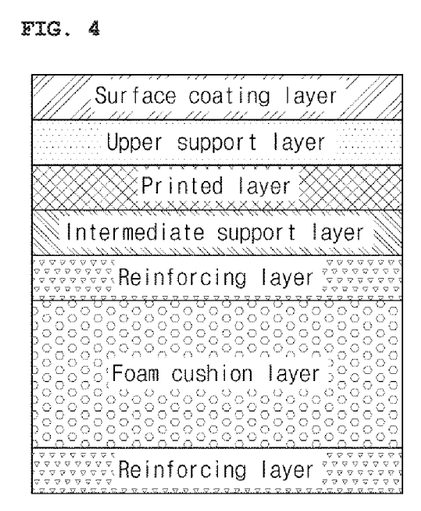
FIGS. 4 to 6 illustrate rigid tiles according to other embodiments of the present invention, wherein additional layers are laminated on the rigid tile shown in each of FIGS. 1 to 3.
Figure 5:
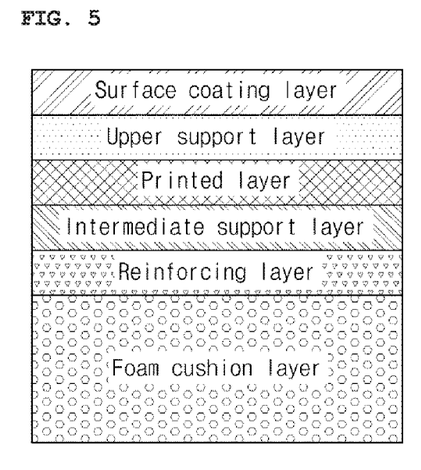
Figure 6:
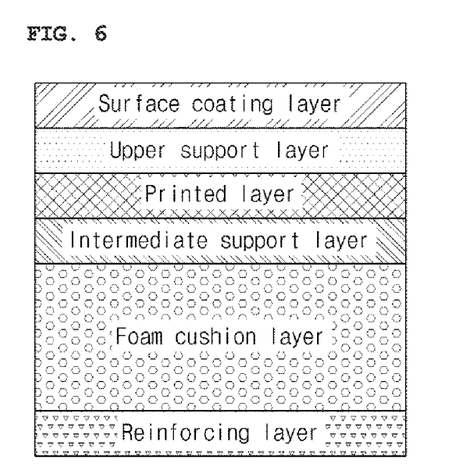

A tile according to other embodiments of the present invention may further include an intermediate support layer on the reinforcing layer or the foam cushion layer. Furthermore, the tile may further include a printed layer on the intermediate support layer, and may further include an upper support layer on the printed layer. In addition, the tile may further include a surface coating layer on the upper support layer. FIG. 4 illustrates a tile having a structure in which an intermediate support layer, a printed layer, an upper support layer and a surface coating layer are further laminated in that order on the reinforcing layer of the three-layer structure shown in FIG. 1. FIG. 5 illustrates a tile having a structure in which an intermediate layer, a printed layer, an upper support layer and a surface coating layer are laminated in that order on the reinforcing layer of the two-layer structure shown in FIG. 2. FIG. 6 illustrates a tile having a structure in which an intermediate layer, a printed layer, an upper support layer and a surface coating layer are laminated in that order on the reinforcing layer of the two-layer structure shown in FIG. 3.

Bonding between the layers may be achieved without using an adhesive. Preferably, a printed layer and an upper support layer are sequentially laminated on the reinforcing layer (rigid core layer), and thermal lamination for each of the layers is performed so that the layers will be bonded to each other.

Figure 10:
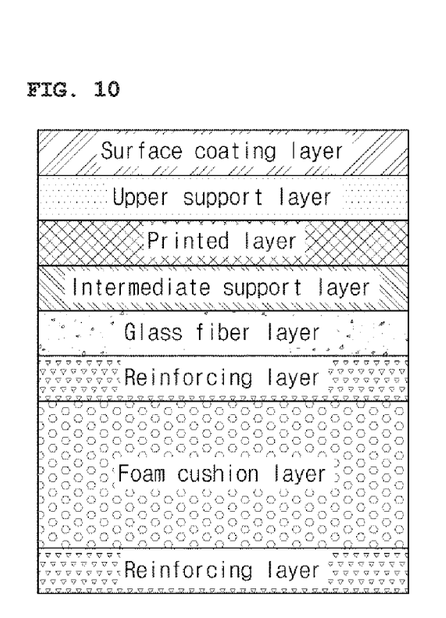
FIG. 10 illustrates a rigid tile according to still another embodiment of the present invention, wherein a dimension-stabilizing layer is additionally formed between an intermediate support layer and an upper reinforcing layer in the rigid tile shown in FIG. 4.

In addition, the tile may further include a dimension-stabilizing layer between the reinforcing layer and the intermediate support layer or between the foam cushion layer and the intermediate support layer. For example, as shown in FIG. 10, the tile may further include the dimension-stabilizing layer between the intermediate support layer and the upper reinforcing layer in the rigid tile shown in FIG. 4.

The dimension-stabilizing layer may be made of, for example, glass fiber. The glass fiber layer serves to provide dimensional stability against heat or moisture. For example, the glass fiber layer may be a glass fiber nonwoven fabric impregnated with polyvinyl chloride resin, but is not limited thereto.

In addition, the tile may further include a lower support layer or a soundproofing layer beneath the foam cushion layer or the reinforcing layer.

Figure 7:
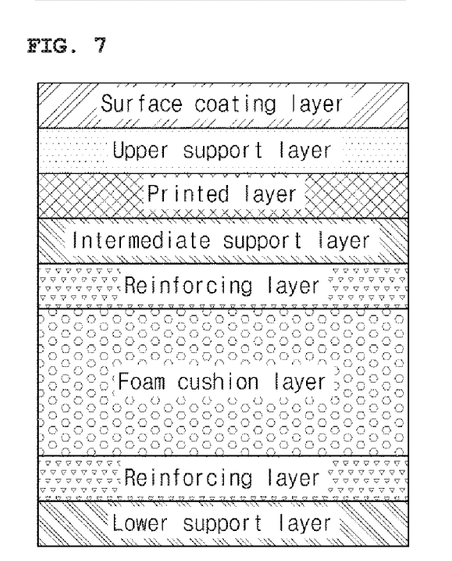
FIGS. 7 to 9 illustrate rigid tiles according to other embodiments of the present invention, wherein additional layers are laminated on and beneath the rigid tile shown in each of FIGS. 1 to 3.
Figure 8:
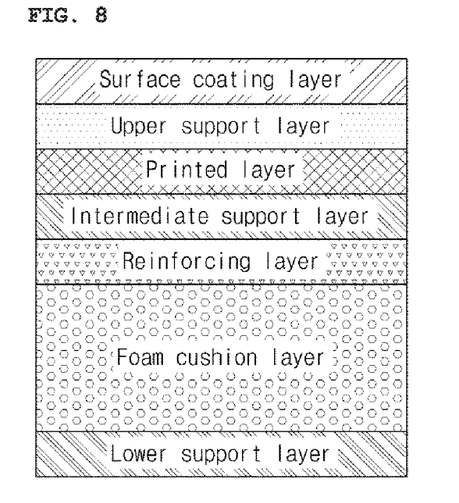
Figure 9:
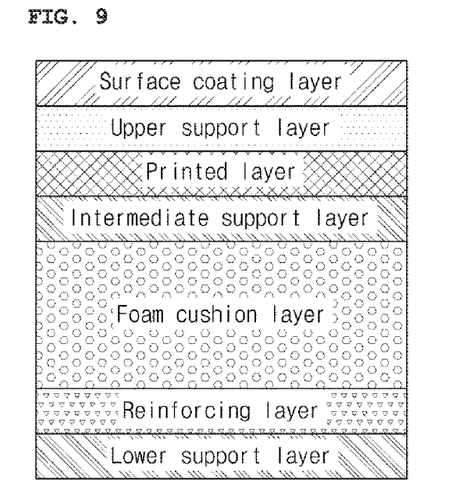

FIG. 7 illustrates a tile that further includes a lower support layer beneath the reinforcing layer of the three-layer structure shown in FIG. 4. FIG. 8 illustrates a tile that further includes a lower support layer beneath the reinforcing layer of the two-layer structure shown in FIG. 5. FIG. 9 illustrates a tile that further includes a lower support layer beneath the reinforcing layer of the two-layer structure shown in FIG. 6. A soundproofing layer (not shown) may further be disposed beneath the lower support layer.

Therefore, a tile according to one embodiment of the present invention may further include, in addition to the foam cushion layer and the reinforcing layer serving to stabilize dimensions and prevent curling, a surface coating layer serving to protect an upper support layer from an external environment and prevent surface contamination, an upper support layer serving to protect a printed layer and impart a three-dimensional feeling, a printed layer serving to provide visual effects, an intermediate support layer having soundproofing function and mounting function, a lower support layer disposed at the bottom so as to assist in preventing curling, and a soundproofing layer capable of blocking noise transfer. This tile may have a square or rectangular sheet shape, but is not limited thereto.

Hereinafter, each layer of the tile according to the present invention will be described.

Surface Coating Layer

The surface coating layer serves to protect the surface of the upper support layer by blocking UV rays, prevent discoloration of the upper support layer and the printed layer, and efficiently reduce damage, abrasion and contamination, and is transparent in appearance. It may be formed by coating with polyurethane or acrylic resin.

Upper Support Layer

In one embodiment of the present invention, the upper support layer is generally a transparent film layer serving to protect the printed layer from abrasion and give a three-dimensional feeling. The upper support layer is a functional surface layer or a functional coating layer, which may include a polymer resin and an additive. The additive includes one or more selected from the group consisting of a plasticizer, a stabilizer and a UV absorber.

The thickness of the upper support layer is 0.1 to 1.2 mm, preferably 0.1 to 0.7 mm. If the thickness of the upper support layer is smaller than 0.1 mm, the abrasion resistance thereof will be insufficient, and if the thickness of the upper support layer is greater than 1.2 mm, economic efficiency will be reduced.

Printed Layer and Intermediate Support Layer

In one embodiment of the present invention, the printed layer and the intermediate support layer may include a polymer resin, a filler and an additive. The printed layer may have various designs and may be made of various materials to thereby provide visual effects. For example, the printed layer may be made of printed paper, wood veneer, stone, beads or the like. The intermediate support layer has a soundproofing function of further preventing noise transfer, enables the final product to be mounted on a base due to its high specific gravity, and exhibits the effects of improving the elasticity of the final product and reducing the production cost. The additive includes one or more selected from a plasticizer, a stabilizer, a pigment and a flame retardant.

The printed layer may include a polymer resin and filler. The filler includes one or more selected from the group consisting of calcium carbonate, silica, alumina, sepiolite, talc, antimony oxide, aluminum oxide, fly ash, and furnace slag.

The thickness of the printed layer is 0.05 to 0.25 mm, preferably 0.07 to 0.15 mm. If the thickness of the printed layer is smaller than 0.05 mm, the masking ability thereof may be reduced so that the color of the intermediate support layer can show through on the printed layer, and if the thickness of the printed layer is greater than 0.25 mm, economic efficiency may be reduced.

Meanwhile, the intermediate support layer includes a polymer resin and a filler. The filler includes one or more selected from the group consisting of calcium carbonate, silica, alumina, sepiolite, talc, antimony oxide, aluminum oxide, fly ash, and furnace slag. The filler is preferably calcium carbonate or sepiolite, but may be selected from various known mineral materials that can function to reduce expansion and contraction and reduce noise transfer.

The thickness of the intermediate support layer is 0.1 to 3 mm, preferably 0.1 to 1 mm. If the thickness of the intermediate support layer is smaller than 0.1 mm, the soundproofing effect, mounting property and elasticity thereof will be insufficient, and if the thickness of the intermediate support layer is greater than 3 mm, the total thickness of the tile product becomes thicker than required.

Lower Support Layer and Soundproofing Layer

In one embodiment of the present invention, the lower support layer and the soundproofing layer may include a polymer resin, a filler and an additive. The lower support layer is mounted on a base and serves to assist in preventing the bending of the base, and the soundproofing layer serves to prevent noise transfer. The additive includes one or more selected from the group consisting of a plasticizer, a stabilizer, a pigment and a flame retardant.

The lower resin includes a polymer resin and a filler. The filler includes one or more selected from the group consisting of calcium carbonate, silica, alumina, sepiolite, talc, antimony oxide, aluminum oxide, fly ash, and furnace slag.

Furthermore, the lower surface of the lower support layer may include a plurality of embossing layers. In comparison to when the lower surface of the foam cushion layer or the reinforcing layer is smooth, when the lower surface includes a plurality of irregularities, moisture or gas can be easily discharged from the layer, and thus deformation of the tile can be efficiently reduced, thereby reducing limitations on a place to which the tile is applied.

The thickness of the lower support layer is 0.1 to 2 mm, preferably 0.1 to 1.0 mm. If the thickness of the lower support layer is smaller than 0.1 mm, it will not be suitable for preventing the bending of the base, and if the thickness of the lower support layer is greater than 2 mm, economic efficiency will be reduced.

Meanwhile, the soundproofing layer includes a polymer resin and a filler. The polymer resin includes one or more selected from the group consisting of polyethylene resin, polypropylene resin, acrylonitrile-butadiene-styrene (ABS) resin, polyvinyl chloride resin, acrylic resin, polyester resin, polystyrene resin, polytetrafluoroethylene, rubber, ethylene vinyl acetate copolymers, and ethylene propylene copolymers. Preferably, the polymer resin is polyvinyl chloride resin, polyethylene resin, or an ethylene vinyl acetate copolymer resin. The filler includes one or more selected from the group consisting of calcium carbonate, silica, alumina, sepiolite, talc, antimony oxide, aluminum oxide, fly ash, barium sulfate, and furnace slag, and is preferably calcium carbonate or sepiolite, but may be selected from various known mineral materials that can function to reduce expansion and contraction and reduce noise transfer.

The thickness of the soundproofing layer is 0.3 to 2 mm, preferably 0.5 to 1.5 mm. If the thickness of the soundproof layer is smaller than 0.3 mm, the soundproofing effect thereof will be insufficient, and if the thickness of the soundproof layer is greater than 2 mm, economic efficiency will be reduced.

The upper support layer, the printed layer, the intermediate support layer and the lower support layer each independently includes one or more polymer resins selected from the group consisting of polyethylene resin, polypropylene resin, ABS resin, polyvinyl chloride resin, acrylic resin, polyester resin, polystyrene resin, polytetrafluoroethylene, ethylene vinyl acetate copolymers, and ethylene propylene copolymers.

The upper support layer, the printed layer, the intermediate support layer and the lower support layer may each independently further include one or more additives selected from the group consisting of a plasticizer, a stabilizer, a filler and a pigment.

In one embodiment of the present invention, a rigid core layer having high mechanical strength and excellent resistance against dimensional deformation is introduced, whereby the dimensional stability of the tile can be improved to minimize curling. Because the dimensional deformation of the tile is minimized, no gap is formed in a flooring material including the tile, so that contamination can be reduced and the ease of cleaning can also be ensured.

A tile according to one embodiment of the present invention is produced as follows: The reinforcing layer and the foam cushion layer are extruded into one laminated sheet through multi sheet laminating system including a main extruder and a side co-extruder. Then, the upper support layer, the printed layer and the like on the sheet and the lower support layer and the like beneath the sheet are laminated by a roll-to-roll method. All the layers, which are laminated in the press machine, are pressed and fused by heat. Finally, the product is obtained.

According to another aspect of the present invention, there is provided a method for producing a tile, for example, a flooring material, the method including the steps of: (a) preparing an upper support layer, a printed layer, an intermediate support layer and a lower support layer by a calendering process; (b) simultaneously forming a foam cushion layer and a reinforcing layer into a sheet through an extruder, and laminating the lower support layer, prepared in step (a), beneath the sheet, followed by heat bonding; and (c) sequentially laminating the intermediate support layer, the printed layer and the upper support layer on the sheet after step (b), and heat-bonding the laminated layer together.

In one embodiment of the present invention, steps (b) and (c) are performed at a temperature of 80 to 250° C.

In one embodiment of the present invention, for production of the rigid tile according to the present invention, the foam cushion layer and the reinforcing layer are extruded through an extruder to form a sheet, and the sheet is heated to a temperature of 100 to 250° C. In this state, the lower support layer, the intermediate support layer, the printed layer and the upper support layer are sequentially laminated on the sheet by a heat bonding process. Then, a liquid material for surface coating is coated on the upper support layer, and cured using a UV irradiation system, thereby forming a surface coating layer. The foam cushion layer and the reinforcing layer are preferably extruded through an extruder and a T-die to form a sheet. A co-extruder is preferably used, but is not limited thereto.

Specifically, independent constituent layers are continuously and sequentially laminated by a heat bonding process. First, a lower support layer is heated to a temperature of 80 to 250° C. by passage through an IR heater and a heating drum, and then laminated on the lower surface of a rigid core layer, which moves horizontally through a conveyor, by a press roll, thereby forming a sheet. Next, an intermediate support layer, heated to a temperature of 80 to 250° C. by passage through an IR heater and a heating drum, is laminated on the upper surface of the sheet by a press roll, and in the same manner, a printed layer and an upper support layer are sequentially bonded to the upper surface of the intermediate support layer. A rigid tile intermediate product produced by lamination in this manner is subjected to a process of forming a surface coating layer, and then subjected to cooling process and cut to a predetermined size, thereby providing a product.

In another embodiment of the present invention, the tile according to the present invention is produced by rendering the reinforcing layer and the foam cushion layer into a single sheet through a double belt press in which a pair of belts is on top and bottom, laminating the layers, injecting another layers including a lower support layer, an intermediate support layer, a printed layer, and a upper support layer, continuously, and then, performing heat fusing the layers by use of heat-press equipment positioned in inside of each conveyor belt.

As described above, the method for producing the tile according to the present invention is a method that uses no adhesive. In conventional methods for producing tiles, particularly flooring materials, which have a multilayer composite structure, a process of laminating and bonding layers having different materials and physical properties is performed, and an adhesion/pressing method is mainly used, which includes applying a liquid adhesive between layers to obtain a sufficient bonding force between the layers, laminating the layers together, pressing the laminated layers, and curing and solidifying the adhesive. In this method, an adhesive application process and an adhesive curing process are additionally performed, and an intermittent pressing process is performed, and for this reason, the production process is complicated and the process time is increased to reduce the production efficiency of the production process.

However, in the present invention, different layers are bonded to each other by a heat bonding process without using an adhesive, and thus a lamination process can be performed in a continuous process, not in an intermittent manner. Accordingly, the method according to the present invention shows high productivity.

In addition, in conventional methods, an excessive amount of an adhesive is used, which may contaminate the surface of the flooring material product and may generate volatile organic compounds harmful to the human body after application of the flooring material. To increase the production efficiency of the adhesion/pressing type production process, a method is used in which different layers of a tile having a multilayer composite structure are heat-bonded to each other at once. However, in this case, there are disadvantages in that the peeling strength between the layers is low and in that the dimensional stability of the tile is not ensured when production process conditions are not thoroughly controlled.

However, in the present invention, a finished tile contains no adhesive, and thus it has excellent dimensional stability, and contamination and appearance defects caused by an adhesive can be reduced.

Hereinafter, the present invention will be described in more detail with reference to examples. However, it will be obvious to those skilled in the art that these examples are for illustrative purposes only and are not intended to limit the scope of the present invention.

EXAMPLES

Example 1: Production of Rigid Multilayer Tile

Different layers, excluding a foam cushion layer and reinforcing layer, were prepared by a calendering process. For preparation of each layer, components corresponding to each layer were mixed at the composition ratio shown in Table 1 below, and the mixed components were heated and pressed uniformly to form a first gel. The first gel was passed through an extruder or a mixing roll to form a second gel.

TABLE 1

| Component | Upper support layer | Printed layer | Intermediate support layer | Reinforcing layer | Foam cushion layer | Reinforcing layer | Lower support layer |
|---|---|---|---|---|---|---|---|
| PVC | 100 | 100 | 100 | 100 | 100 | 100 | 100 |
| Filler | 0 | 20 | 300 | 200 | 150 | 200 | 60 |
| Plasticizer | 25 | 10 | 50 | 0 | 0 | 0 | 30 |
| Foaming agent | 0 | 0 | 0 | 0 | 3 | 0 | 0 |
| Others | suitable amount | suitable amount | suitable amount | suitable amount | suitable amount | suitable amount | suitable amount |

(unit: phr)

Next, the second gel was fed between calendar rolls, gelled completely, and then subjected to a calendering process, thereby producing a sheet-shaped intermediate product. The produced intermediate product was wound in a roll shape, and then placed on an in-line conveyor that continuously rotates according to the lamination sequence, after which different layers were sequentially heat-bonded to a base layer which was a foam cushion layer or a reinforcing layer, which was a sheet produced through a co-extruder equipped with a T-die. Specifically, each layer wound in a roll shape was preheated by an IR heater and a heating drum while it was fed onto an in-line conveyor, after which each layer was passed through press rolls while a lower support layer beneath the foam cushion layer or the reinforcing layer, an intermediate support layer on the foam cushion layer or the reinforcing layer, a printed layer on the intermediate support layer, and a top intermediate layer on the printed layer, were sequentially laminated by heat bonding. The resulting tile formed by integration at high temperature and pressure was cooled by a cooling process, and then cut to a suitable size, followed by an annealing process to remove internal stress. Then, a photocurable resin such as acrylate-based resin was applied to the upper support layer of the cut tile and cured by UV light to form a surface coating layer, after which the tile was further cut to a desired size, thereby producing a rigid multilayer tile. The cross-section of the produced tile is as shown in FIG. 7, and the thickness of each layer of the tile is shown in Table 2 below.

TABLE 2

|  | Reinforcing layer | Foam cushion layer | Reinforcing layer |
|---|---|---|---|
| Example 1 | 1.0 mm | 3 mm | 1.0 mm |
| Example 2 | 0.5 mm | 4 mm | 0.5 mm |
| Example 3 | 1.0 mm | 5 mm | 1.0 mm |

Examples 2 and 3: Production of Rigid Multilayer Tiles

Tiles were produced in the same manner as described in Example 1, except for the thicknesses of the foam cushion layer and the reinforcing layer.

Comparative Example 1: Production of WPC Tile

As a core layer, a wood plastic composite (WPC) sheet (thickness: 5.0 mm) was used. On the wood plastic composite (WPC) sheet, a laminate of an upper support layer (thickness: 0.5 mm) made of polyvinyl chloride (PVC), a printed layer (thickness: 0.1 mm) and an intermediate support layer (thickness: 0.8 mm), which was previously prepared by a heat bonding process, was bonded using an adhesive. Beneath the wood plastic composite (WPC) sheet, a lower support layer (thickness: 0.6 mm) was bonded using an adhesive. Next, the resulting laminate was pressed for 6 hours, and aged and cured at room temperature for 1 day, thereby producing a WPC flooring material.

Comparative Example 2: Production of Rigid Tile by Extrusion/Heat Bonding Process A sheet-shaped rigid core layer having a thickness of 3.8 mm was prepared by an extrusion process. Next, an upper support layer (thickness: 0.5 mm), a printed layer (thickness: 0.1 mm) and a lower support layer (thickness: 0.6 mm), prepared by a calendering process and wound in a roll shape, were sequentially heat-bonded to the rigid core layer, thereby producing a rigid flooring material.

Test Example 1: Evaluation of Dimensional Stability

To evaluate the dimensional stabilities of the tiles produced in Examples 1, 2 and 3 and Comparative Example 1, the following test was performed. Specifically, according to a test method for a length change cause by heating as described in KS M 3802, each of the tile products was heated at 80° C. for 6 hours, and then cooled at room temperature for 1 hour, after which the percent dimensional change in each of the length direction and width direction of each tile product was measured. The results of the measurement are shown in Table 3 below. In this case, higher percent dimensional changes indicate better dimensional stability.

TABLE 3

|  |  | Comparative Example 1 | Example 1 | Example 2 | Example 3 |
|---|---|---|---|---|---|
| Percent dimensional change after heating | Length | 1.75 | 0.10 | 0.20 | 0.17 |
|  | Width | 0.17 | 0.06 | 0.17 | 0.10 |

As can be seen in Table 3 above, the dimensional stabilities of Examples 1, 2 and 3 were better than that of Comparative Example 1.

Test Example 2: Evaluation of Anti-Curling Property (Stability Against Bending)

To evaluate the anti-curling properties of the tiles produced in Examples 1, 2 and 3 and Comparative Example 1, the following test was performed. Specifically, according to the curling measurement method provided in ISO 23999, each of the tile products was heated at 80° C. for 6 hours, and then cooled at room temperature for 1 hour, after which the extent of bending of each tile product with respect to the initial state was measured. The results of the measurement are shown in Table 4 below.

TABLE 4

|  | Comparative Example 1 | Example 1 | Example 2 | Example 3 |
|---|---|---|---|---|
| Anti-curling property (mm) | 5.5 | 0.5 | 0.8 | 0.7 |

Regarding the anti-curling property, lower measurement values indicate better anti-curling properties. As can be seen in Table 4 above, the anti-curling properties of Examples 1, 2 and 3 were better than that of Comparative Example 1.

Test Example 3: Evaluation of Waterproof Property

To evaluate the waterproof properties of the tiles produced in Examples 1, 2 and 3 and Comparative Example 1, each of the tiles was applied on a wood plate in a room having an area of 9.9 m², after which each tile was heated to a temperature of 60° C., maintained for 3 days at that temperature, cooled at room temperature for 1 day, and then wiped with a wet mop. After wiping, the amount of water absorbed into the wood plate underlying each tile was measured to determine percent water absorption. The results of the measurement are shown in Table 5 below.

TABLE 5

|  | Comparative Example 1 | Example 1 | Example 2 | Example 3 |
|---|---|---|---|---|
| Percent water absorption | 4.5 | 0.3 | 0.5 | 0.7 |

Lower percent water absorption indicates a better waterproof property.

As can be seen in Table 5 above, the waterproof properties of Examples 1, 2 and 3 were better than that of Comparative Example 1.

Test Example 4: Weight and Specific Gravity

To examine the specific gravities of the tiles produced in Examples 1, 2 and 3 and Comparative Example 2, each tile sample was cut to a size of 30 mm×30 mm, and the specific gravity thereof was measured using a specific gravity meter. The results of the measurement are shown in Table 6 below.

TABLE 6

|  | Comparative Example 2 | Example 1 | Example 2 | Example 3 |
|---|---|---|---|---|
| Specific gravity | 1.85 | 1.12 | 0.86 | 0.97 |

A lower specific gravity indicates a lighter weight per volume.

As can be seen in Table 6 above, the tiles of Examples 1, 2 and 3 had specific gravities lower than that of Comparative Example 2, indicating that they had better lightweight properties.

Test Example 5: Evaluation of Environmentally Friendly Feature (TVOC Emission)

To evaluate the environmentally friendly features of the tiles produced in Examples 1, 2 and 3 and Comparative Examples 1 and 2, total volatile organic compound (TVOC) emission from each tile was measured. The results of the measurement are shown in Table 7 below.

TABLE 7

|  | Comparative Example 1 | Comparative Example 2 | Example 1 | Example 2 | Example 3 |
|---|---|---|---|---|---|
| TVOC emission (mg/m² × hr) | 3.92 | 1.8 | 1.2 | 1.1 | 1.5 |

In this case, TVOC emission was measured using a small chamber method in accordance with ISO 16000-6.

As can be seen in Table 7 above, the tiles of Examples 1, 2 and 3 showed lower TVOC emissions compared to those of Comparative Examples 1 and 2, indicating that they were environmentally friendly.

As described above, according to the present invention, a tile may be provided, which includes a rigid core layer and a foam cushion layer, and thus the surface of the tile is hard and the interior thereof is light. Accordingly, the tile gives a texture like wood, and, at the same time, has high mechanical strength, excellent resistance against deformation caused by temperature changes, and excellent dimensional stability and anti-curling (stability against bending) properties.

According to the present invention, the tile includes a foam cushion layer which enables the weight of the tile to be reduced and which can improve a walking feeling and soundproofing effects.

According to the present invention, the tile includes a plurality of layers having different compositions, and thus impulsive noises are effectively reduced by the difference in refractive index between the individual layers. In addition, the tile includes a foam cushion layer or a soundproofing layer, which can improve a walking feeling and soundproofing effects.

According to the present invention, the tile has excellent dimensional stability so that no gap will occur between the tiles after application of the tiles. Accordingly, the contamination of the tile can be minimized, and the ease of cleaning of the tile can be improved.

According to the present invention, no adhesive is used and the use of a plasticizer is minimized, and thus an environmentally friendly tile can be provided.

According to the present invention, a foam cushion layer and a reinforcing layer can be simultaneously formed into a sheet through an extruder, and thus the bonding force between the layers and the efficiency of production can be improved.

In addition, a heat bonding process is used, and thus it is possible to prevent tile surface contamination resulting from the use of an excessive amount of an adhesive and prevent contamination caused by adhesive movement from a lower layer to a surface layer, thereby reducing appearance defects, unlike in the case of an adhesion/pressing process. Furthermore, the concentration of total volatile organic compound (TVOCs) which can be generated in the tile can be significantly reduced to render the tile environmentally friendly.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A rigid multilayer tile comprising a foam cushion layer, a reinforcing layer, an intermediate support layer on the reinforcing layer or the foam cushion layer, a printed layer on the intermediate support layer;
wherein the foam cushion layer comprises one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU);
wherein the foam cushion layer contains 0 to 20 phr of a plasticizer, 0 to 300 phr of a filler, and 0 to 5 phr of a foaming agent;
wherein the foam cushion layer has an expansion ratio of 120 to 300%;
wherein the reinforcing layer comprises a rigid core layer;
wherein the rigid core layer comprises one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU);
wherein the thickness of the reinforcing layer is 0.2 to 7 mm;
wherein the rigid core layer contains 0 to 20 phr of a plasticizer and 0 to 500 phr of a filler;
wherein the polymer resin contained in the foam cushion layer is the same as the polymer resin contained in the reinforcing layer, and the reinforcing layer is in direct contact with the foam cushion layer;
wherein the layers are bonded to each other without using an adhesive; and
wherein the foam cushion layer and the reinforcing layer are formed into a sheet at once by extrusion without using an adhesive.

2. The rigid multilayer tile of claim 1, wherein the foam cushion layer comprises a composite of the polymer resin with a wood chip or a cork chip, wherein the content of the chip in the foam cushion layer is 1 to 40 phr.

3. The rigid multilayer tile of claim 1, wherein the reinforcing layer is disposed on or beneath, or on and beneath the foam cushion layer.

4. The rigid multilayer tile of claim 3, wherein each of the layers is bonded to an adjacent layer by heat bonding.

5. The rigid multilayer tile of claim 1, further comprising an upper support layer on the printed layer.

6. The rigid multilayer tile of claim 5, wherein each of the layers is bonded to an adjacent layer by heat bonding.

7. The rigid multilayer tile of claim 1, further comprising a dimension-stabilizing layer between the reinforcing layer and the intermediate support layer or between the foam cushion layer and the intermediate layer.

8. The rigid multilayer tile of claim 7, wherein each of the layers is bonded to an adjacent layer by heat bonding.

9. The rigid multilayer tile of claim 1, further comprising a lower support layer beneath the foam cushion layer or the reinforcing layer.

10. The rigid multilayer tile of claim 9, wherein each of the layers is bonded to an adjacent layer by heat bonding.

11. A method for producing the rigid multilayer tile of claim 1, the method comprising:
 (a) preparing raw materials for a foam cushion layer;
 (b) preparing raw materials for a reinforcing layer; and
 (c) extruding the raw materials described in (a) and (b) at once into one sheet;
wherein the foam cushion layer comprises one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU);

wherein the foam cushion layer contains 0 to 20 phr of a plasticizer, 0 to 300 phr of a filler, and 0 to 5 phr of a foaming agent;

wherein the foam cushion layer has an expansion ratio of 120 to 300%;

wherein the reinforcing layer comprises a rigid core layer;

wherein the rigid core layer comprises one or more polymer resins selected from the group consisting of polyethylene resin, polypropylene resin, ABS resin, polyvinyl chloride resin, acrylic resin, polyester resin, polystyrene resin, polytetrafluoroethylene, ethylene-vinyl acetate copolymers, ethylene-propylene copolymers, and thermoplastic polyurethane (TPU); and wherein the rigid core layer contains 0 to 20 phr of a plasticizer and 0 to 500 phr of a filler.

12. The method of claim 11, further comprising preparing an upper support layer and a printed layer by a calendering process.

13. The method of claim 12, further comprising, after preparing the upper support layer and the printed layer, sequentially laminating a printed layer and an upper support layer over the foam cushion layer and the reinforcing layer, and heat-bonding each of the laminated layers.

* * * * *